United States Patent
Chiduruppa et al.

(10) Patent No.: US 9,584,551 B2
(45) Date of Patent: Feb. 28, 2017

(54) SIP USER RELEASE

(71) Applicant: ORACLE INTERNATIONAL CORPORATION, Redwood Shores, CA (US)

(72) Inventors: Sreenivas Chiduruppa, Westford, MA (US); Ranjani Chandrasekar, Wilmington, MA (US); Paul F. Smith, Norton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 281 days.

(21) Appl. No.: 14/505,993

(22) Filed: Oct. 3, 2014

(65) Prior Publication Data
US 2016/0100375 A1 Apr. 7, 2016

(51) Int. Cl.
G06F 15/16 (2006.01)
H04L 29/06 (2006.01)

(52) U.S. Cl.
CPC ........ H04L 65/1006 (2013.01); H04L 65/102 (2013.01); H04L 65/1016 (2013.01); H04L 65/1046 (2013.01); H04L 65/1073 (2013.01)

(58) Field of Classification Search
CPC .......... H04L 65/1006; H04L 29/12188; H04L 61/1588; H04L 29/06197; H04L 63/308; H04L 29/06217
USPC .................................................. 709/228, 200
See application file for complete search history.

(56) References Cited

U.S. PATENT DOCUMENTS

| | | | |
|---|---|---|---|
| 8,175,575 B2 | 5/2012 | Cai et al. | |
| 8,369,313 B2 | 2/2013 | Lu et al. | |
| 2004/0088424 A1 | 5/2004 | Park et al. | |
| 2009/0249131 A1* | 10/2009 | Mitomo | H04M 3/51 714/48 |
| 2010/0136970 A1 | 6/2010 | Mui et al. | |
| 2010/0167762 A1 | 7/2010 | Pandey et al. | |
| 2010/0238920 A1* | 9/2010 | Salkintzis | H04W 76/026 370/357 |
| 2011/0060771 A1* | 3/2011 | Llorente | H04L 29/12132 707/812 |
| 2013/0019012 A1 | 1/2013 | Henrikson et al. | |
| 2013/0054806 A1 | 2/2013 | Francis et al. | |
| 2014/0006632 A1 | 1/2014 | Evens | |
| 2014/0128113 A1* | 5/2014 | Zisimopoulos | H04W 4/14 455/466 |

OTHER PUBLICATIONS

Oracle Data Sheet; Oracle Communications; "Oracle Communications Core Session Manager"; 2013.

* cited by examiner

Primary Examiner — El Hadji Sall
(74) Attorney, Agent, or Firm — Miles & Stockbridge P.C.

(57) ABSTRACT

A system that releases a Session Initiation Protocol ("SIP") user from a serving function on an Internet Protocol Multimedia Subsystem ("IMS") network receives a REGISTER refresh from a registered user equipment ("UE"). In response to the REGISTER refresh, the system sends a server assignment request to a home subscriber server ("HSS") that clears the name of the Serving Call Session Control Function ("S-CSCF") assigned for the registered user. The system then sends a gateway timeout or server timeout that would trigger the UE to send an initial REGISTER request.

20 Claims, 4 Drawing Sheets

SIP USER RELEASE

FIELD

One embodiment is directed generally to a communication network, and in particular to a Session Initiation Protocol based communication session over a communication network.

BACKGROUND INFORMATION

Session Initiation Protocol ("SIP") is an application-layer control protocol for creating, modifying, and terminating sessions with one or more users. These sessions include Internet telephone calls, multimedia distribution and multimedia conferences. SIP invitations create sessions that allow the users to agree on a set of compatible media types based on session descriptions configurable within the protocol. A SIP session with one or more users can occur over a SIP based network, such as the Internet Protocol Multimedia Subsystem ("IMS") network.

IMS is a standardized next generation networking architecture for providing multimedia services in mobile/wireless and fixed/wire-line communication networks. IMS uses the Internet protocol ("IP") for packet-data communications generally, and voice over IP ("VoIP") for voice communications, based on a 3GPP/3GPP2 standardized implementation of SIP. IMS includes session control, connection control, and an application services framework along with subscriber and services data. It enables the use of new converged voice and data services, while facilitating the interoperability of these converged services between subscribers.

SUMMARY

One embodiment is a system that releases a Session Initiation Protocol ("SIP") user from a serving function on an Internet Protocol Multimedia Subsystem ("IMS") network. The system receives a REGISTER refresh from a registered user equipment ("UE"). In response to the REGISTER refresh, the system sends a server assignment request to a home subscriber server ("HSS") that clears the name of the Serving Call Session Control Function ("S-CSCF") assigned for the registered user. The system then sends a gateway timeout or server timeout that would trigger the UE to send an initial REGISTER request.

DETAILED DESCRIPTION

One embodiment is an IMS network that releases a SIP user at a Serving Call Session Control Function ("S-CSCF") server by waiting for the SIP user to refresh its registration. Instead of refreshing the registration, the SIP user is rejected with a timeout message and in turn tries to register again. When registering, the SIP user can be routed to a different S-CSCF server.

Figure 1:
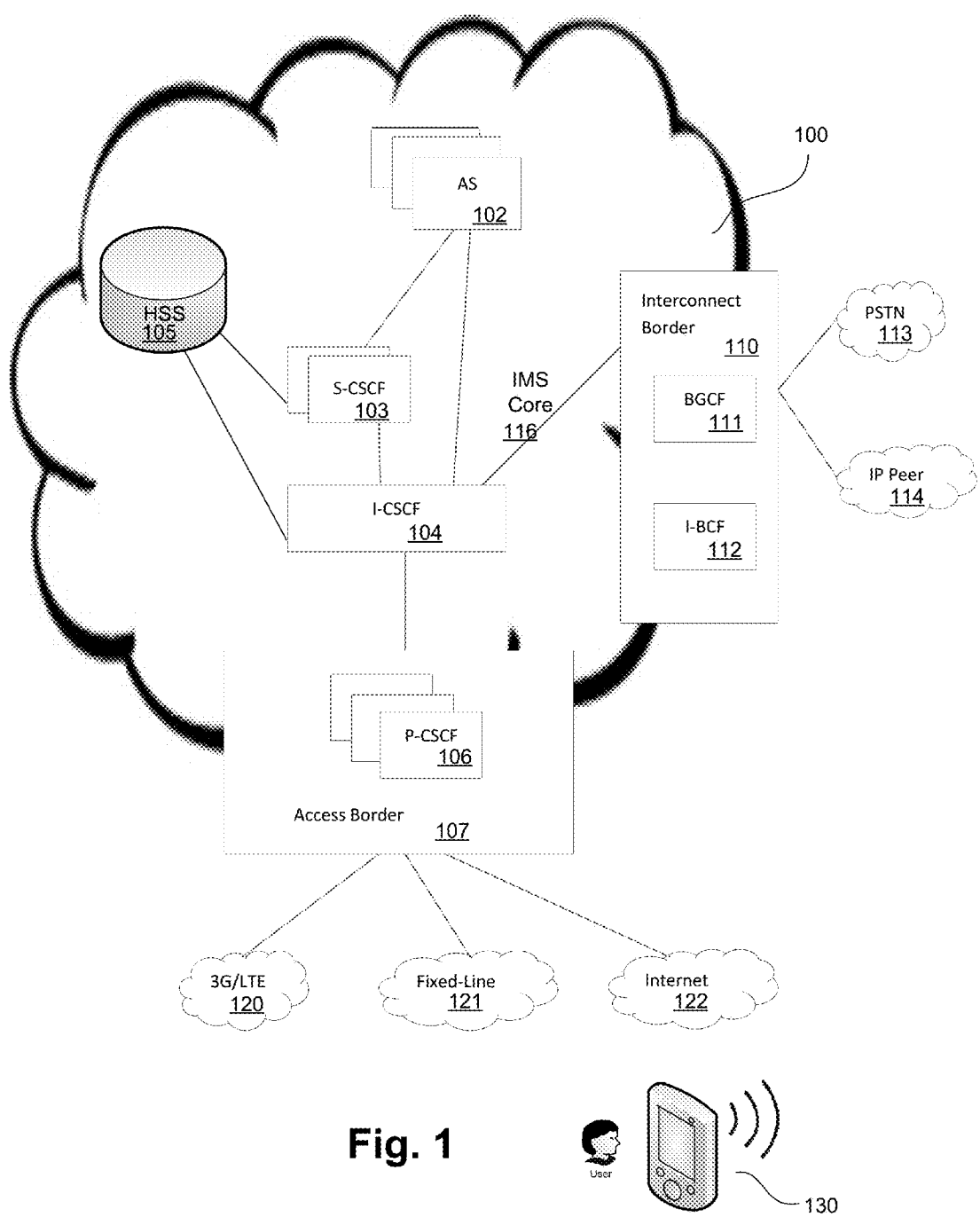
FIG. 1 is an overview diagram of an IMS network including network elements that implement embodiments of the present invention and/or interact with embodiments of the present invention.

FIG. 1 is an overview diagram of an IMS network 100 including network elements that implement embodiments of the present invention and/or interact with embodiments of the present invention. Network 100 includes an IMS core 116 that includes an Interrogating Call Session Control Function ("I-CSCF") 104 and one or more Serving Call Session Control Functions ("S-CSCF") 103 or "serving functions". In one embodiment, each S-CSCF 103 is implemented by a Core Session Manager ("CSM") from Oracle Corp. that provides a serving function/registrar. IMS network 100 further includes an access border 107 that includes one or more Proxy Call Session Control Functions ("P-CSCF") 106 such as Session Border Controllers ("SBC"). In general, the CSCF entities are implemented by one or more SIP servers or proxies.

IMS network 100 further includes one or more Application Servers 102 ("AS") and a Home Subscriber Server 105 ("HSS"). An Interconnect Border 110 couples IMS core 116 to various external networks, including the Public Switched Telephone Network 113 ("PSTN") and an Internet Protocol ("IP") peer network 114.

Access border 107 couples User Equipment 130 ("UE") to IMS network 100. UE 130 may be any device used by an end-user for communication, including a smartphone, a laptop computer, a tablet, etc. UE 130 can connect to IMS network 100 through a third generation Long Term Evolution ("3G/LTE") network 120, a fixed-line network 121, via the Internet 122, or using any known communication methods.

In one embodiment, UE 130 participates in a Session Initiation Protocol ("SIP") based session. SIP in general is a signaling technique that uses messages to "build up" and "tear down" communication links between users. Generally, SIP messages are either requests from a client to a server or responses from a server to a client. To initiate a session of communications, UE 130 may transfer a SIP request to IMS network 100 via access border 107. The request includes a SIP "method", such as "REGISTER" for registering contact information, "INVITE" for inviting other users into a communication session, "ACK" for acknowledgement, "CANCEL" for terminating a session transaction, "BYE" for terminating sessions, and "OPTIONS" for querying servers about their capabilities. Before UE 130 can establish communications over network 100, UE 130 must be registered with IMS network 100.

UE 130 registers with IMS network 100 by generating a REGISTER request and transferring the REGISTER request to I-CSCF 104 via access border 107. The REGISTER request establishes a duration for a session of communications (e.g., a binding) with IMS network 100. The REGISTER request includes a header configured with information used in establishing the duration of the session. Alternatively I-CSCF 104 may establish a default session duration if no duration is specified in the REGISTER request. As each user is responsible for refreshing bindings that have been established, UE 130 would have previously updated the duration of the session with a registration request.

In embodiments that use a CSM as a serving function/registrar, the known mechanism used to release a user from a communication session relies on the SIP user subscribing to registration event notifications. However it is not always the case that users subscribe for these notifications either to avoid overloading the serving function or simply because the subscription functionality does not exist.

In contrast, in embodiments of the present invention, the CSM (or any other serving function/registrar) instead waits for the SIP user to refresh its registration, and then instead of accepting the refresh it re-directs the user using a 504 response. The serving function at this point also notifies the other parties, such as the application servers, subscriber database, proxy functions etc., interested in this release using notifications. In one embodiment, the functionality is enabled on the CSM via command-line interface ("CLI") command—release-user commands.

Figure 2:
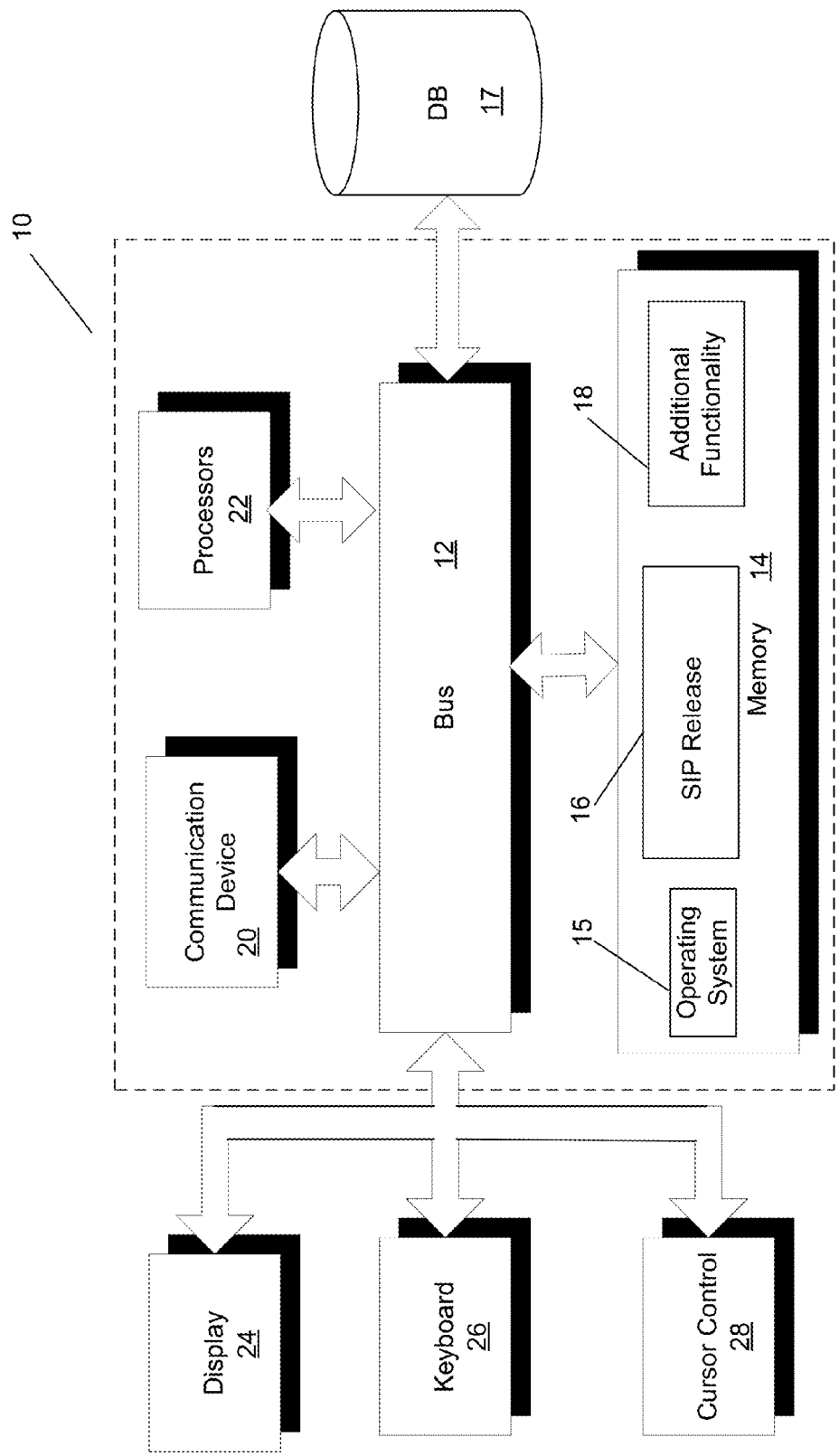
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of user equipment, system 10 may be a smartphone that includes a processor, memory and a display, but may not include one or more of the other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a SIP release module 16 for releasing a SIP user, and all other functionality disclosed herein. System 10 can be part of a larger system, such as added functionality to the "Oracle Communications Core Session Manager" from Oracle Corp. Therefore, system 10 can include one or more additional functional modules 18 to include the additional functionality. A database 17 is coupled to bus 12 to provide centralized storage for modules 16 and 18.

Referring again to FIG. 1, a user at a UE will register with one of S-CSCF 103 in order to carry out an SIP based communication session. UE 130 registers with IMS network 100 by sending a REGISTER request to P-CSCF 106. P-CSCF 106 then sends the REGISTER request to I-CSCF 104. I-CSCF 104 then picks one of the S-CSCFs 103 based on capabilities and sends the REGISTER request to selected S-CSCF 103. After a successful registration, the user is always served by this S-CSCF throughout the SIP session. However, the user may need to be released from the S-CSCF because of, for example, the S-CSCF going out of service or the network administrator wanting to move users to a different serving S-CSCF. Therefore, the user needs to be informed that it can no longer be served at this S-CSCF, which will cause UE 130 to send an initial REGISTER request for it to be served by a different S-CSCF.

Known 3GPP procedures used to release a user from a serving S-CSCF rely on the SIP user subscribing to registration event notifications. However, in some instances users fail to subscribe to these notifications either to avoid overloading the S-CSCF or simply because the subscription functionality does not exist. In contrast, with embodiments of the present invention, the S-CSCF instead waits for the SIP user to refresh its registration, and then instead of accepting the refresh, it redirects the user using, for example, a SIP 504 server time-out response. The S-CSCF at this point also notifies the other entities that would be interested in the release, such as the application servers, subscriber database, proxy functions etc., using registration event notifications if those entities are subscribed for the user's registration status.

As per the 3GPP specifications, UE 130 sends an initial REGISTER request on receiving a SIP 504 server time-out response from S-CSCF 103. P-CSCF 106 will send the REGISTER request to I-CSCF 104 which then forwards the REGISTER request to a different S-CSCF 103. Therefore, UE 130 is released from the previous serving S-CSCF without a significant window of outage.

Figure 3:
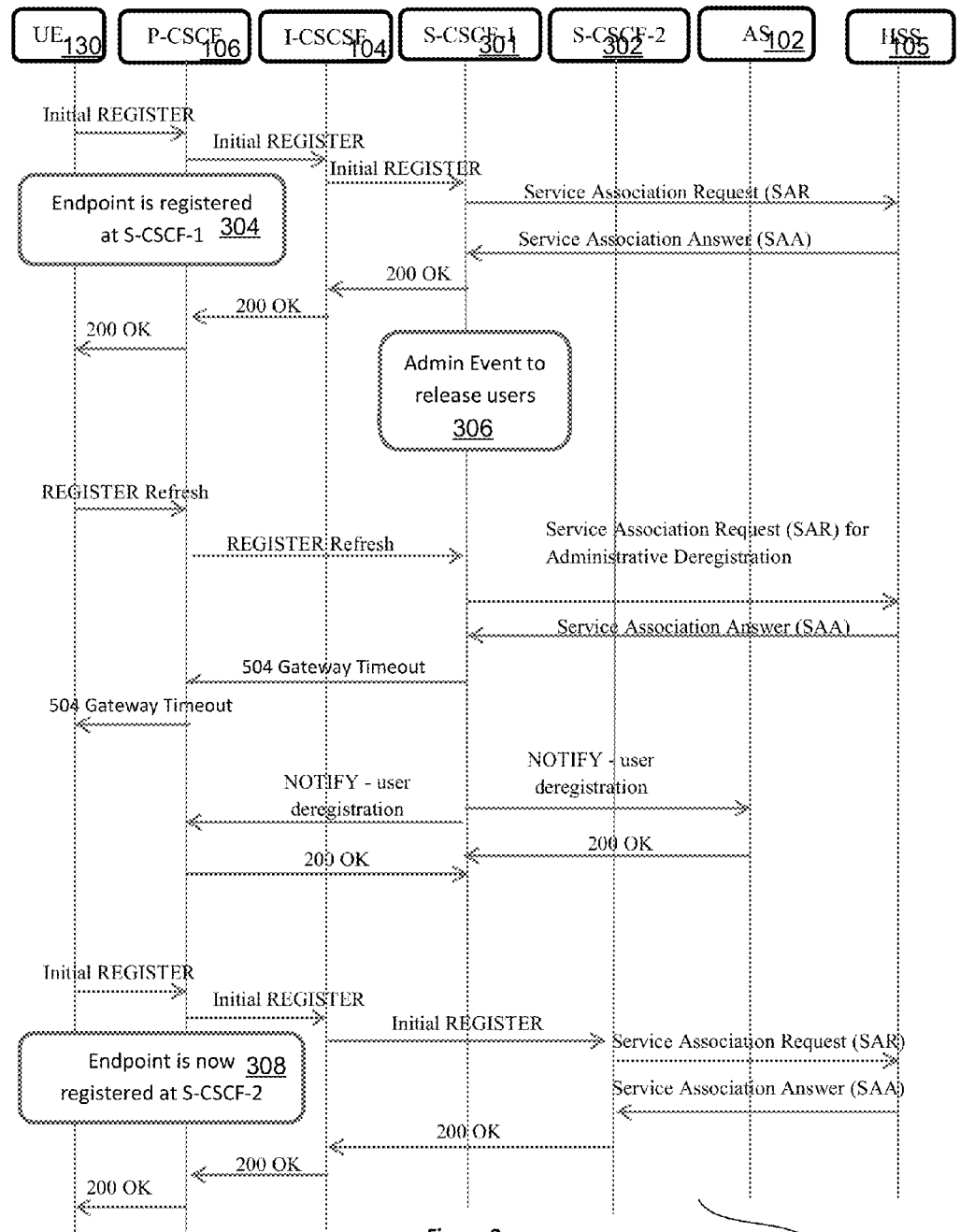
FIG. 3 illustrates a call flow diagram for releasing a UE from a first S-CSCF and registering the UE with a second S-CSCF in accordance with one embodiment.

FIG. 3 illustrates a call flow diagram 300 for releasing a UE 130 from a first S-CSCF (S-CSCF-1 301) and registering the UE with a second S-CSCF (S-CSCF-2 302) in accordance with one embodiment. Diagram 300 shows how UE 130 is released from one S-CSCF and served by a different second S-CSCF without an explicit registration event subscription from the UE.

The call flow of FIG. 3 includes SIP response status codes and commands Codes and commands and messages "REGISTER," "Service Association Request" ("SAR") and "Service Association Answer" ("SAA") that result in, at 304, the endpoint UE 130 registering at S-CSCF-1 301. After SIP response status codes "200 OK," at 306, an administrative event to release users is issued. Although as shown in FIG. 3 the release is issued after a user was first registered, in other embodiments an administration request to release a user can occur at any time. After SIP response status codes and commands "REGISTER," "Service Association Request" ("SAR"), "Service Association Answer" ("SAA"), "504 Gateway/Server Timeout", "NOTIFY" and "200 OK," at 308, the endpoint UE 130 is now registered at S-CSCF-2 302.

Figure 4:
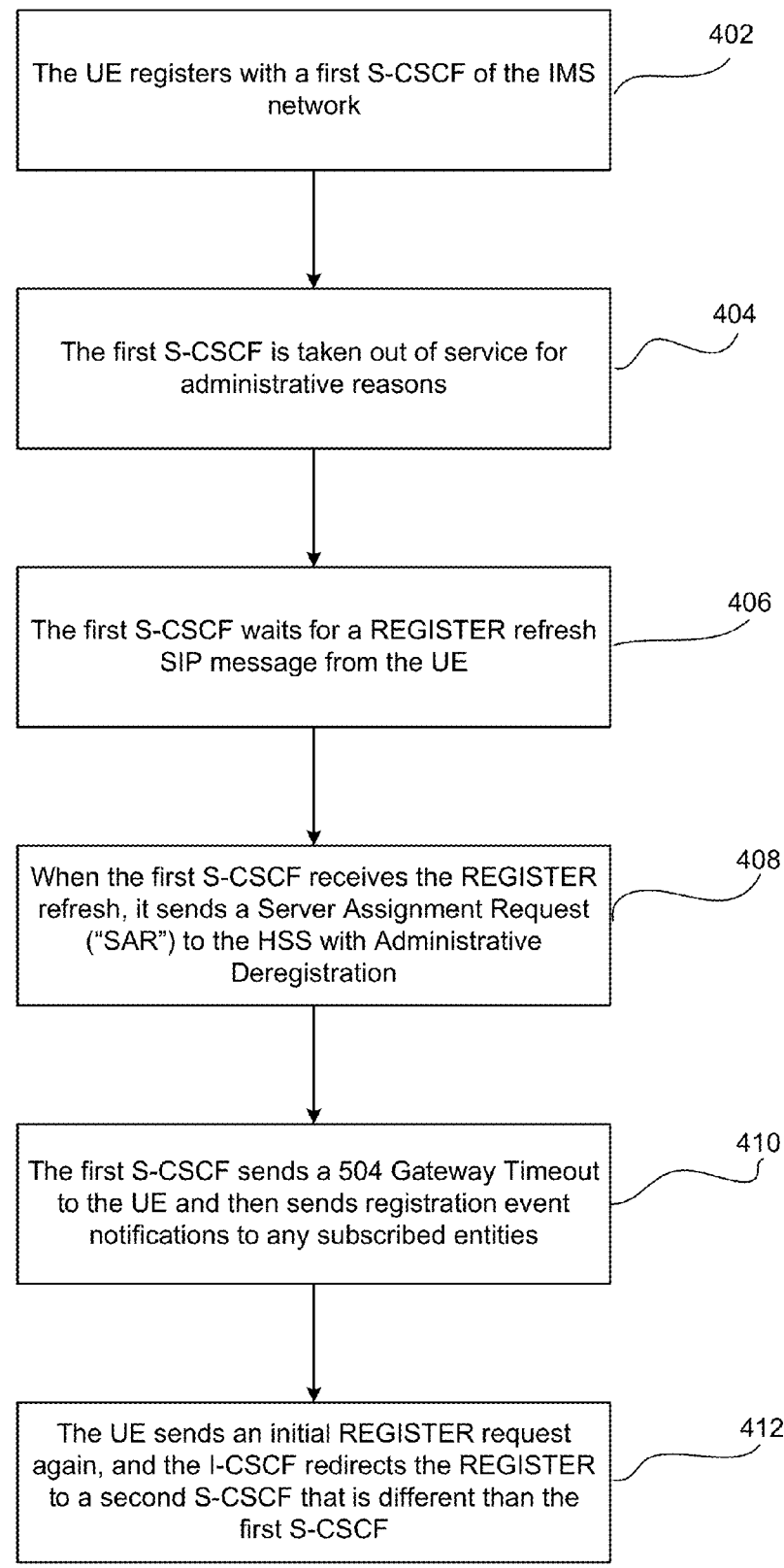
FIG. 4 is a flow diagram of a SIP release module of FIG. 1 when releasing a SIP user in accordance with embodiments of the present invention.

FIG. 4 is a flow diagram of SIP release module 16 of FIG. 1 when releasing a SIP user in accordance with embodiments of the present invention. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, UE 130 registers with a first S-CSCF of the IMS network.

At 404, the network administration of the IMS network decides to take the first S-CSCF out of service, or the first S-CSCF is going to go out of service for some other reason. In general, the administrator can either decide to take the S-CSCF out of service, or the administrator may simply want to release a number of users from this S-CSCF without causing loss of service for the users.

At 406, the first S-CSCF waits for a REGISTER refresh SIP message from UE 130, instead of immediately removing its state from HSS 105 and removing its association for the user as with prior known methods. The first S-CSCF continues to serve the users until it receives the REGISTER refresh SIP message so that there is minimum loss of service for the user.

At 408, when the first S-CSCF receives a REGISTER refresh from UE 130, it sends a Server Assignment Request ("SAR") to HSS 105 with an "Administrative Deregistration" to notify the HSS that the UE is no longer assigned to the first S-CSCF. In one embodiment, the first S-CSCF only performs this functionality if there are no active sessions (i.e., active phone calls) for the UE.

At 410, after sending the SAR to HSS 105, the first S-CSCF sends a 504 Gateway/Server Timeout to UE 130. The first S-CSCF then sends registration event notifications to any entity that subscribed for registration state changes, such as Application Servers 102 and P-CSCF 106. The timeout at 410 is adapted to trigger the UE 130 to send an initial REGISTER request.

On receiving a "504 SIP Server time-out message", at 412 UE 130 will send an initial REGISTER request again, and I-CSCF 104 in IMS core 116 then redirects the REGISTER to a second S-CSCF that is different than the first S-CSCF.

For embodiments in which a CSM provides the serving function/registrar, the CSM will wait for users to refresh its registration. On receiving the refresh, in one embodiment the CSM will do the following procedure to release the user only IF there are no active sessions for that user. If there are any active sessions for that user, the next register refresh sent after the call/session completes will release the user. The CSM performs the following functions:

The CSM will notify the subscriber database that this entity is no longer the assigned S-CSCF for the user. For example, the CSM will remove itself as the assigned S-CSCF for the user from the HSS by sending an SAR with an action of ADMINISTRATIVE DEREGISTRATION;

The CSM will send a 504 response back to the user for the register refresh; and

The CSM will send registration event notifications to all the subscribers such as application servers, proxy functions.

For one CSM embodiment, CLI commands implement the functionality. One command is the "release-user <count>":

1. This command can be issued to release users for which this CSM is the assigned S-CSCF. The command will allow the user to enter the number users to be released from this CSM.
   <count> is the number of users to be released from the CSM 2. After the command is issued, the CSM will set-up states to remember that a rebalance is in progress and will keep track of the number of users that are released from this CSM.
   a. The CSM will wait for endpoints to send REGISTER refresh messages.
   b. On receiving a REGISTER refresh, the CSM will do the following if and only if there are NO active session for this user.
   c. The CSM will send an SAR request to the HSS with the reason code of ADMINISTRATIVE_DEREGISTRATION.
   d. The REGISTER refreshes will be responded with a 504 Gateway Timeout.
   e. After sending the 504, the CSM will send NOTIFY messages to all REGEVENT subscribers to indicate that this user is removed from this CSM.
   f. The user will be removed from the registration cache as well.
3. When in the middle of removing users, if the CSM receives REGISTER message for new users it will let the new user register successfully.
4. When in the middle of removing users, if the CSM receives a REGISTER message with expires=0, the CSM does the following:
   a. When an endpoint deregisters when we are in the middle of releasing users, the CSM will continue with deregistration.
   b. If there is only the one contact for the user, it will be counted as a user released from the CSM.
   c. If there is more than one count, the CSM will not count that endpoint deregistration towards the released user count.
   d. In both the above scenarios, the CSM will respond with 200 OK and SAR with USER DEREGISTRATION and not 504 with ADMIN DEREGISTRATION in the SAR.
5. When the CSM sends the SAR to the HSS for administration deregistration, if there is an internal error or if the SAR is responded with an error, the CSM will continue to release the user as described above.
6. Calls will not be accepted for users that are in the middle of getting cleaned up from this CSM—CSM will return a 504 Gateway Timeout. However calls for other users in the CSM will be processed as usual.
7. Issuing this command will set a 30 min. timer, during which the CSM will try to release as many as users as possible. If by the 30 min. period the CSM is not able to release as many users as requested in the command, the CSM will stop with the number of users it was able to release in that 30 min. window.
8. When in the middle of removing users, if the CLI command is issued another time, the count from the second command will override the first one. The CSM will restart the 30 min. window and the counter. A log will be added that the previous command will be suspended at the NOTICE level.

Another CLI command for the CSM implemented embodiment is the "release-user stop":
If the user decides to stop the CSM from releasing users after issuing the command, the user can issue the "release-users stop" command to cancel the last issued release-users command. The status of the release-user command will be logged at NOTICE level and also be displayed on the CLI.
No. of users requested to be released:
No. of users successfully released:
Time Remaining:

Another CLI command for the CSM implemented embodiment is the "release-user status":
The "release-user status" command can be issued at any time to see the current or last status of the command.
No. of users requested to be released:
No. of users successfully released:
Time Remaining:

As disclosed, embodiments release a SIP user by waiting for the SIP user to refresh its registration and then redirecting the SIP user to another serving function/S-CSCF. Embodiments allow serving functions to be gracefully shutdown without loss of service to the end user. Embodiments further can provide the rebalancing of users across different serving functions without disruption in service. The graceful shutdown and rebalancing in accordance with embodiments of the invention may be beneficial for Network Function Virtualization ("NFV"), where Virtual Network Functions ("VNF" s) such as the serving function are expected to be scaled in and scaled out as necessary.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to release a Session Initiation Protocol (SIP) user from a first serving function on an Internet Protocol Multimedia Subsystem (IMS) network, the releasing comprising:
   in response to a REGISTER request, registering a user equipment (UE) with the first serving function;
   determining that the UE is to be released from the first serving function;
   in response to the determining, waiting to receive a REGISTER refresh from the registered UE;
   in response to the REGISTER refresh, sending a server assignment request to a home subscriber server (HSS); and
   sending a gateway timeout to the UE.

2. The computer-readable medium of claim 1, wherein the first serving function comprises a Serving Call Session Control Function (S-CSCF) SIP server.

3. The computer-readable medium of claim 1, further comprising sending registration event notifications to all subscribers after sending the timeout.

4. The computer-readable medium of claim 1, wherein an Interrogating Call Session Control Function (I-CSCF) SIP server receives an initial REGISTER request from the UE.

5. The computer-readable medium of claim 4, wherein the I-CSCF SIP server redirects the REGISTER request to a second serving function.

6. The computer-readable medium of claim 1, wherein the releasing is in response to the first serving function going out of service for administrative reasons.

7. The computer-readable medium of claim 1, further comprising in response to the REGISTER refresh, sending an administrative deregistration to the HSS.

8. The computer-readable medium of claim 1, wherein the timeout comprises a 504 Gateway/Server timeout that triggers the UE to send an initial REGISTER request.

9. A method of releasing a Session Initiation Protocol (SIP) user from a first serving function on an Internet Protocol Multimedia Subsystem (IMS) network, the method comprising:
   in response to a REGISTER request, registering a user equipment (UE) with the first serving function;
   determining that the UE is to be released from the first serving function;
   in response to the determining, waiting to receive a REGISTER refresh from the registered UE;
   in response to the REGISTER refresh, sending a server assignment request to a home subscriber server (HSS); and
   sending a server timeout to the UE that is adapted to trigger the UE to send an initial REGISTER request.

10. The method of claim 9, wherein the first serving function comprises a Serving Call Session Control Function (S-CSCF) SIP server.

11. The method of claim 9, further comprising sending registration event notifications to all subscribers after sending the timeout.

12. The method of claim 9, wherein an Interrogating Call Session Control Function (I-CSCF) SIP server receives an initial REGISTER request from the UE after the UE receives the timeout.

13. The method of claim 12, wherein the I-CSCF SIP server redirects the REGISTER request to a second serving function.

14. The method of claim 9, wherein the releasing is in response to the first serving function going out of service for administrative reasons.

15. The method of claim 9, further comprising in response to the REGISTER refresh, sending an administrative deregistration to the HSS.

16. The method of claim 9, wherein the timeout comprises a 504 Gateway/Server timeout.

17. A Serving Call Session Control Function (S-CSCF) Session Initiation Protocol (SIP) server on an Internet Protocol Multimedia Subsystem (IMS) network, the server comprising:
   a processor;
   a storage device coupled to the processor and storing instructions that cause the processor to release a SIP user, the releasing comprising:
      in response to a REGISTER request, registering a user equipment (UE) with a first serving function;
      determining that the UE is to be released from the first serving function;
      in response to the determining, waiting to receive a REGISTER refresh from the registered UE;
      in response to the REGISTER refresh, sending a server assignment request to a home subscriber server (HSS); and
      sending a gateway timeout to the UE.

18. The server of claim 17, the releasing further comprising sending registration event notifications to all subscribers after sending the timeout.

19. The server of claim 17, wherein an Interrogating Call Session Control Function (I-CSCF) SIP server receives an initial REGISTER request from the UE after the UE receives the timeout.

20. The server of claim 17, wherein the timeout comprises a 504 Gateway/Server timeout.

* * * * *

UNITED STATES PATENT AND TRADEMARK OFFICE
CERTIFICATE OF CORRECTION

PATENT NO. : 9,584,551 B2  
APPLICATION NO. : 14/505993  
DATED : February 28, 2017  
INVENTOR(S) : Chiduruppa et al.

Page 1 of 1

It is certified that error appears in the above-identified patent and that said Letters Patent is hereby corrected as shown below:

In the Drawings

On sheet 3 of 4, in Fig. 3, Line 6, delete "(SAR" and insert -- (SAR) --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*